March 24, 1959　　W. L. REAR ET AL　　2,879,072
COLLAPSIBLE TRAILER
Filed Oct. 1, 1956

INVENTOR.
WALLACE L. REAR
DONALD J. PROULX
BY Williamson, Schroeder,
Adams + Meyers
ATTORNEYS

United States Patent Office 2,879,072
Patented Mar. 24, 1959

2,879,072

COLLAPSIBLE TRAILER

Wallace L. Rear and Donald J. Proulx,
Minneapolis, Minn.

Application October 1, 1956, Serial No. 613,329

2 Claims. (Cl. 280—40)

This invention relates to trailers adapted to be drawn behind automotive and other vehicles and particularly to a trailer which may be collapsed compactly when not in use for storage or shipment.

It is an object of our invention to provide a simple but sturdy collapsible trailer wherein the wheels and other extensible parts may be compactly folded or collapsed within the confines of the frame or chassis body.

Another object of the invention is the provision of a highly efficient trailer occupying a minimum amount of space when not in use and having provision in conjunction with the collapsible wheel mountings and wheels for absorption of shocks in travel of the chassis over the road.

A further object is the provision of a collapsible trailer of the class defined wherein the body may be readily set up in box form for hauling or may be itself collapsed and extended to form a chassis for hauling elongated objects such as boats, lumber, and relatively flat objects having lengths much greater than the trailer chassis.

A still further object is the provision, in trailer or other vehicle constructions, of swingably collapsible, braced wheel mountings having provision for absorption of shocks therein.

These and other objects and advantages of our invention will more fully appear from the following description made in connection with the accompanying drawings, wherein like reference characters refer to the same parts throughout the several views and in which.

Figure 5:
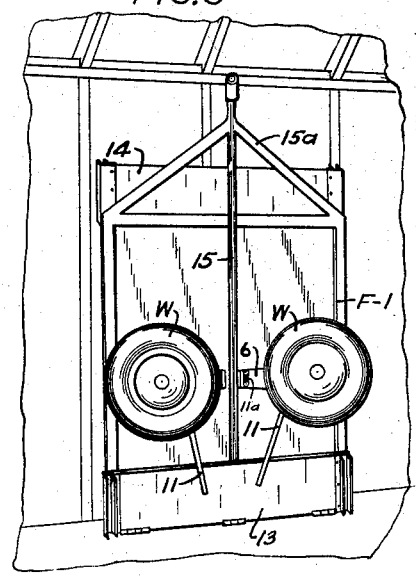
Figure 5 is a similar view of a trailer completely collapsed and stored against a garage wall.

In the embodiment illustrated, a rigid body or frame F in the form, as shown, of a rectangular wooden platform is provided which may have, in the form shown in Fig. 5, a metal reinforcing openwork frame F-1 reinforcing the peripheral edges thereof at the underside.

The embodiment illustrated utilizes a pair of axially aligned wheels W having, when set up for running or operation, the common axis of the wheels disposed transversely and medially of the frame or chassis body F. The wheels W are mounted upon inwardly collapsible wheel mountings indicated as entireties by the numeral 7 which are, in turn, swingably connected with transversely disposed heavy mounting plates 6 affixed flatwise and transversely to the underside of the chassis body F.

Figure 6:
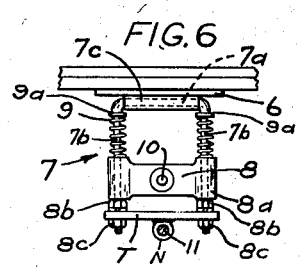
Figure 6 is a side elevation on a much larger scale illustrating one of the wheel mountings with wheel detached in operative position for travel.

Each of the wheel mountings 7, in the form illustrated (see Fig. 6), comprises a swingable, wheel-supporting bracket in the form of a heavy U-shaped rod or frame having the intermediate portion 7a thereof journaled in a hinge sleeve 7c which is welded or otherwise affixed to the outer end of the appropriate mounting plate 6. The legs 7b of the U-shaped rod have mounted thereon and traversing the same, adjacent their outer ends, the slidable cross head 8 having cylindrical ends which slidably fit with working clearance upon the end portions of the bracket-legs 7b. The outer extremities of the leg 7b of the bracket are threaded to receive inner stop bolts 8b and outer clamping bolts 8c. A tie plate T is interposed between the two sets of bolts 8b and 8c and serves to interconnect and reinforce the outer ends of the bracket legs 7b.

To cushion shocks from uneven terrain and road surfaces, heavy coil springs 9 surround intermediate portions of the bracket legs 7b and are interposed between collars 9a and the inner sides of the sleeve portions 8a of the cross head, urging the cross head and consequently the wheel carried thereby downwardly when the brackets are disposed for travel of the trailer.

The outer longitudinal sides of the cross heads 8 of each wheel mounting carry outwardly projecting stub axles or wheel spindles 10 upon which the respective wheels are rotatably mounted. It will be noted that the axis of wheels W extends perpendicularly to the hinge axis of the wheel-mounting brackets.

From the foregoing description in connection with the drawings, it will be seen that the wheels may be bodily swung with their mounting brackets from the operative positions shown in Figs. 1 to 4 to the completely collapsed position shown in Fig. 5 through inward swinging on the axis of the hinge sleeves 7c.

To positively retain and securely brace the wheel mountings 7 in operative, erect position for travel, we provide heavy rigid brace rods 11 which in operation, are diagonally interposed between the inner ends of the respective mounting plates 6 and the outer ends or tie plates T of the wheel mountings 7. It is essential that one end of each brace rod be disconnectible from its attached element.

As shown, at the inner ends of each of the mounting plates 6, a pair of heavy, upstanding ears 6a are provided in spaced relation for accommodating the thickness of the appropriate rod 11 and rod 11 is diametrically apertured to receive a locking pin 11a which passes through and is secured to said ears. Brace rods 11 have substantially universal joint connections at their outer ends with the respective tie plates T of the wheel mountings, which, as shown, comprise swivel retaining collars N pivotally secured to the tie plates T, said rods 11 at their outer ends passing therethrough and having enlarged extremities at the ends thereof. The structure is similar to the conventional connecting rods used on automobile steering mechanism.

Figure 4:
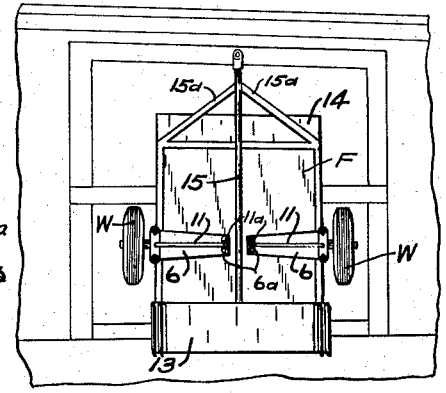
Figure 4 is a view illustrating the embodiment of our invention stored vertically against the wall of a garage but with the wheels and wheel mountings not yet collapsed.
Figure 9:
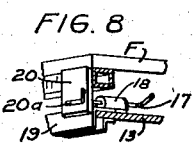
Fig. 9 is a detail view showing in side elevation the detachable connection between one of the base rods and the mounting plate.

The chassis frame or body of the form of the invention illustrated comprises a collapsible body having low side, front and rear walls. The front wall 14 is hinged along its lower edge to the bottom of the rectangular chassis body F and is adapted to be swung forwardly to the position shown in Figs. 3 and 4 against the draft bar connections 15. The rear wall 13 of the box body is hinged to the rear edge of the rectangular frame F for folding rearwardly and then inwardly against the bottom of the rectangular frame as is illustrated in Figs. 4 and 5. The side walls 12 of the box body are hinged along their lower edges for swinging inwardly flush against the top of the frame body F as clearly shown in Figs. 1 to 3.

Figure 1:
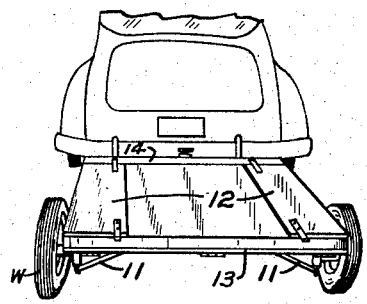
Figure 1 is a rear perspective view showing an embodiment of our invention attached to the rear of an automobile with the walls of the box chassis collapsed and extended at the forward end for the hauling of elongated relatively flat objects such as boats.
Figure 2:
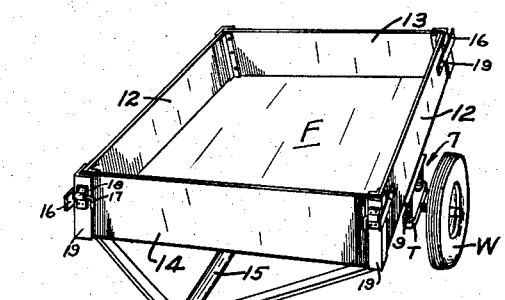
Figure 2 is a front perspective view of the same trailer with the box body set up for use.
Figure 3:
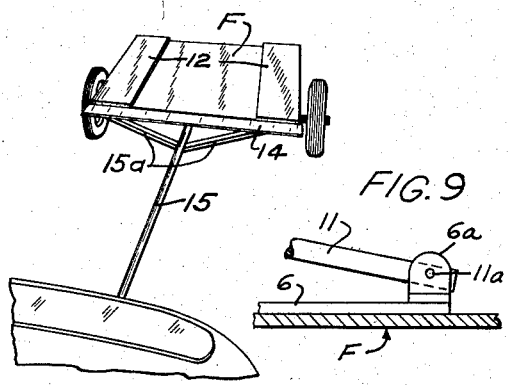
Figure 3 is a top perspective view of the trailer attached to an automobile with the box body collapsed and wherein a longer draft bar is utilized.
Figures 7, 8:
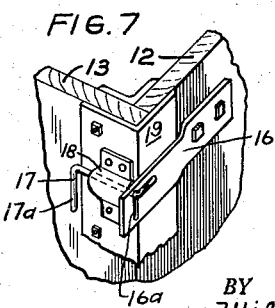
Figs. 7 and 8 are detailed perspective views showing the means for rigidly securing adjacent ends of the box body sides.

Suitable means for rigidly interconnecting the abutted and opposed edges of the front and side walls and the rear and side walls (forming the corners of the box) are provided which may take many forms, and as shown comprise rigid plates 16 bolted as shown to the ends of the longitudinal box sides 12 and extending past said ends with transverse locking slots 16a formed in the projecting portions thereof for cooperation with a crank locking element 17 having a handle 17a and having a shank which is journaled in a bearing 18 affixed to an angle iron 19 which is bolted to the end portions of the front and rear box sides 13 and 14 respectively (see Figs. 2 and 7).

It will be seen that with our structure, as described, the wheels and wheel mountings may be collapsed very compactly against the bottom of the frame or body F by releasing the brace rods 11 from bracing engagement with the socket 6a at the inner ends of the mounting plates and bodily swinging the wheels and the mounting brackets 7 inwardly. The mounting brackets actually engage in flush relationship, referring to the cross heads 8, with the bottom of the chassis body in such collapsed position and the wheels at their inner faces are disposed only an inch or two from the bottom of the body.

The upright walls of the box may be collapsed as previously stated so that the side walls lie flush against the top of the body while the rear wall is folded flush against the bottom of the body.

While various draft connections may be utilized, we have shown, on the embodiment illustrated, an elongated central draft bar 15 which may run the full length of the body and be secured thereto for reinforcing purposes in conjunction with diagonally disposed draft arms 15a connected with the forward portion of bar 15 and connected at their outer ends rigidly with the front end of the chassis body F.

If desired, means such as shown in Fig. 8 may be provided for retaining the upstanding box walls 12, 13, and 14 in collapsed horizontal position. The means shown cooperates with the crank bolt 17a of the front and rear box sections 14 and 13, and employs a vertically disposed plate 20 having a transverse bolt receiving slot 20a therein. For the rear side 13 this plate is affixed to the bottom of the chassis body, and for the front box side 14 the plate is applied appropriately to the draft member 15.

The very simple wheel mounting structure with the hinge bracket and slidable cross heads 8 and associated shock absorption springs provides an exceedingly sturdy but relatively light, collapsible wheel mounting which will withstand heavy loads and long continuous wear.

It will of course be understood that various changes may be made in the form, details and arrangement of the parts without departing from the scope of our invention.

What is claimed is:

1. In collapsible trailer construction or the like, a chassis frame having parallel, rigid side portions normally extending substantially horizontally and longitudinally, a pair of inwardly collapsible wheel mountings each comprising an inverted U-shaped element having the intermediate portion of the U pivoted to one of said side portions of said frame on an axis disposed parallel to the line of travel of said trailer, said mountings being swingable from collapsed position approximately against said frame to erect position and then being substantially aligned, a slide head mounted for limited sliding movement upon the two leg elements of each of said U-shaped members, said slide head carrying an intermediately disposed wheel spindle extending in a direction perpendicularly to the swing axis of said member, yieldable cushioning means interposed between the intermediate hinged portion of each mounting and its related slide head, a wheel mounted on each of said wheel spindles, said wheels being of diameters related to the spaced distance between said hinge mountings to lie in side-by-side relation against the bottom of said frame with the central planes of said wheels substantially aligned when said mountings are swung inwardly and means connected with said mountings for bracing and holding the same as well as said wheels in vertical, operating positions.

2. In collapsible trailer construction or the like, a pair of normally substantially horizontal, rigid mounting plates for attachment to and against the underside of a platform body, said plates having at their outer portions hinge elements for positioning in widely spaced, parallel relation longitudinally of said body and said plates extending inwardly for some distance and having depending brace rod connecting portions, an inwardly swingable wheel mounting for each of said mounting plates having an intermediate cooperating hinge element pivotally connected to the hinge element provided by said plate and having parallel, outwardly extending slide portions adapted to be disposed substantially vertically when said wheel mountings are operatively disposed, a slide head having its ends mounted on said slide portions for limited up and down movement, yieldable cushioning means interposed between the hinged portion of each of said wheel mountings and said slide head associated therewith, said mountings having means for interconnecting and bracing the outer ends of said slide members, thereby limiting outward movement of said slide head, a wheel spindle extending perpendicularly from each of said slide heads and affixed thereto, a wheel mounted on each of said wheel spindles, said wheels being of a uniform diameter and related to the spaced distance between the hinges of said mountings to lie in side-by-side spaced relation against the bottom of said plates with the central planes defined by said wheels being substantially aligned when said mountings are swung inwardly and a pair of rigid brace rods, each interconnected at its outer end with one of said wheel mountings and connected in operation at its inner end with the associated rod-connecting portion of the appropriate mounting plate.

References Cited in the file of this patent

UNITED STATES PATENTS

| 863,972 | Ehlers | Aug. 20, 1907 |
| 2,456,013 | Nelson | Dec. 14, 1948 |
| 2,469,506 | Kerr | May 10, 1949 |

FOREIGN PATENTS

| 375,429 | Italy | Oct. 7, 1939 |